July 11, 1939.   L. A. HOLMES   2,165,703
APPARATUS FOR TREATING OIL
Filed March 3, 1937   2 Sheets-Sheet 1
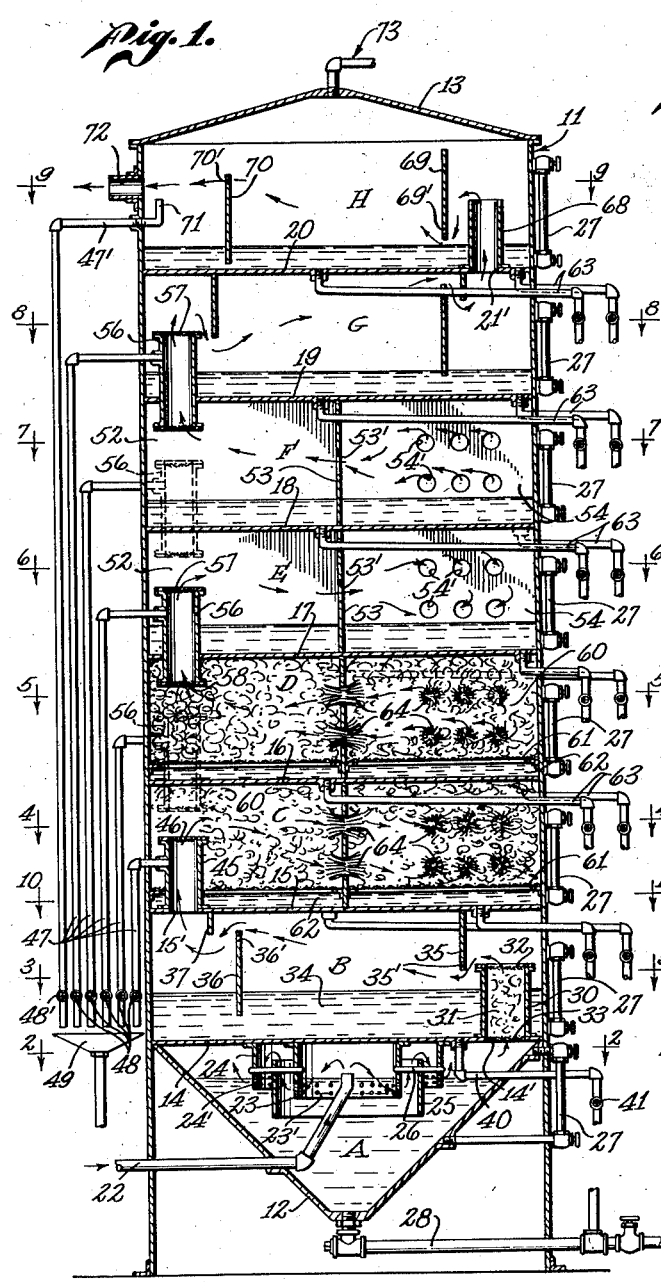
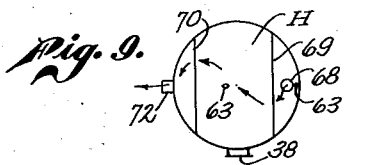
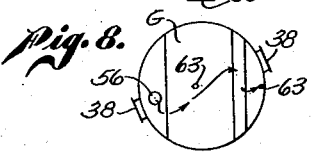
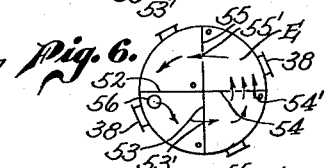
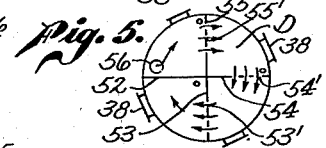
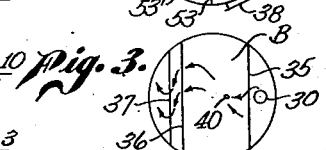
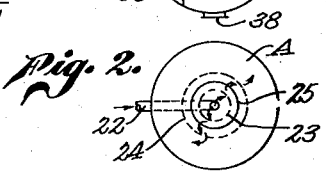
Inventor
Lawrence A. Holmes
By
Attorney

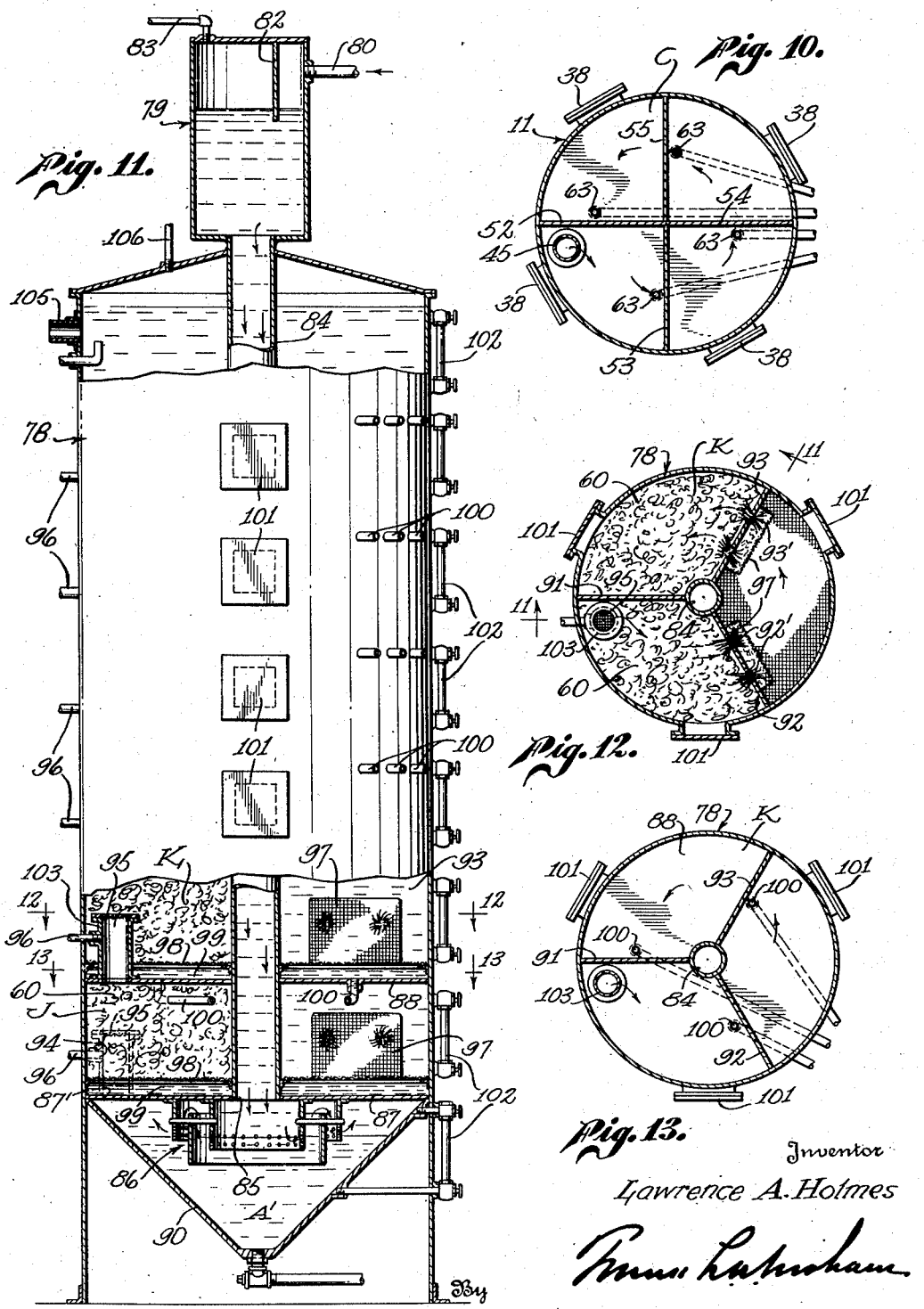

Patented July 11, 1939

2,165,703

UNITED STATES PATENT OFFICE 2,165,703

APPARATUS FOR TREATING OIL

Lawrence A. Holmes, Whittier, Calif.

Application March 3, 1937, Serial No. 128,786

15 Claims. (Cl. 210—49)

This invention relates to apparatus designed to separate water, solids, and entrained gas from contaminated oil in order to produce a clean petroleum free of solids and substantially free of water for refining operations. The invention is particularly in the provision of improved apparatus for the treatment of oil as it comes from the well in contaminated form to break the emulsions of oil and water and remove the water, solids and gas therefrom without the aid of chemical reagents, or if necessary, with the aid of only a relatively small amount of reagent.

In the ordinary types of apparatus used for treating contaminated oil emulsions, various types of filters and scrubbing chambers are used and it is generally necessary to add a chemical reagent to the emulsion to be treated if the separation of the water and oil is to be successful. Furthermore, in ordinary scrubbing chambers employing wood wool, sand, or other filter material, the emulsion passing through the filter "channels" the filter material, thus decreasing the efficiency of the apparatus. Usually all excelsior filters become "water-logged" after a short period of use and then become inefficient. It is also true that with the use of ordinary apparatus it is impossible to clean the oil to the purchasing company's buying requirements without the use of relatively large quantities of chemical emulsion-breaking reagents.

In view of these deficiencies in the ordinary apparatus, it is a primary object of this invention to provide improved apparatus for the treatment of contaminated oil as it comes from the well, whereby the emulsion is broken and the water, solids, and gas separated from the oil so as to leave an oil having an absolute minimum of mud and bottom settlings. When so treated, the oil obtained is of the highest gravity and well within the purchaser's requirements. It is also an object of this invention to accomplish this without the use of reagents in treating some types of oil and water emulsions, and to accomplish this with the addition to the emulsion of only a relatively small amount of reagent with types of emulsions less responsive to mechanical treatment.

It is a further object of this invention to provide apparatus of the type indicated which includes a plurality of scrubbing chambers filled with wood wool or other suitable material disposed one above the other, each of which is divided into a plurality of compartments designed for the purpose of preventing channeling of the wood wool or other filter material therein and for the purpose of providing a tortuous passage for the fluid to be treated. In connection with the division of the scrubbing chambers into compartments, it is an object of this invention to provide unique means for packing the communicating passages located in the partitions or baffle walls separating the chambers into compartments. In this connection each compartment is designed to be easily accessible for repacking. It is also an object of this invention to provide means for preventing the scrubbing material in the compartments from becoming water-logged and to provide means co-operating therewith for withdrawing liquid from each of the compartments.

It is also an object of this invention to provide a plurality of chambers which may be used as wash chambers or merely as separator chambers, some of which may also be divided into compartments in a manner similar to the scrubbing chambers. These wash or separator chambers may be located both above and below the scrubbing chambers, or they may be alternately placed with respect to the scrubbing chambers. It is also an object of this invention to provide means for separating sand from the oil to be treated as it enters the apparatus.

It is a further object of this invention to provide apparatus of the type indicated which has means for withdrawing the fluid which is being treated at various stages of its passage through the apparatus in order to determine the efficiency of the various parts of the device. It is also an object to provide means for injecting a treating fluid at various stages in the passage through the device of the oil being treated.

These objects are attained in the apparatus shown in the accompanying drawings, in which:

Fig. 1 is a sectional elevation of the device, embodying a preferred form of the invention.

Fig. 2 is a diagrammatic sectional plan view of the lower chamber of the apparatus on line 2—2 of Fig. 1.

Fig. 3 is a diagrammatic sectional plan view on line 3—3 of Fig. 1.

Fig. 4 is a diagrammatic sectional plan view on line 4—4 of Fig. 1.

Fig. 5 is a diagrammatic sectional plan view on line 5—5 of Fig. 1.

Fig. 6 is a diagrammatic sectional plan view on line 6—6 of Fig. 1.

Fig. 7 is a diagrammatic sectional plan view on line 7—7 of Fig. 1.

Fig. 8 is a diagrammatic sectional plan view on line 8—8 of Fig. 1.

Fig. 9 is a diagrammatic sectional plan view on line 9—9 of Fig. 1.

Fig. 10 is a sectional plan view on line 10—10 of Fig. 1.

Fig. 11 is an elevation of a modified form of the invention partly in section. The broken away portion at the top is a true section through the center of the device, but the lower broken away portion is a section on line 11—11 of Fig. 12.

Fig. 12 is a sectional plan view on line 12—12 of Fig. 11.

Fig. 13 is a sectional plan view on line 13—13 of Fig. 11.

Referring to the drawing, reference numeral 11 indicates a vertical shell or tank which is shown as being provided with a conical bottom 12 and a cover member 13. The shell 11 is provided with a plurality of chambers by means of horizontal partitions 14, 15, 16, 17, 18, 19 and 20. In the preferred form of the invention the bottom chamber A is a combination wash and sand separating chamber.

Above this is a wash and separator chamber B. The next two succeeding chambers C and D are scrubbing chambers containing wood wool or other suitable filter material. Above this is shown a plurality of chambers E, F, G and H which may be used as wash chambers or as separator chambers, as desired.

Although the drawings illustrate apparatus having a particular arrangement of scrubbing chambers with respect to the other chambers, it is within the scope of this invention to alternately place the wash (or separator) and scrubbing chambers with respect to each other or to place them in any desired series. Thus, for treating certain types of oil it might be advisable to employ first a scrubbing chamber and then a wash chamber followed by another scrubbing chamber and in turn another wash chamber, or merely a separator chamber.

The lower chamber A is a combined wash and sand settling or separating chamber into which the oil to be treated is initially conducted by means of the fluid inlet pipe 22. The contaminated oil may be either fed by gravity or pumped. The inlet pipe empties into the upper portion of the chamber and within the confines of the inner circular baffle 23 mounted on the partition wall 14 and depending therefrom. Concentric with baffle 23 and surrounding it is outer baffle 24. Between these two baffles an intermediate circular baffle 25 is suspended on cross rods 26. The lower edges of baffles 23 and 24 are perforated at 23' and 24' respectively for the purpose of dividing the oil being treated into a plurality of fine streams as it passes from the orifice of the inlet pipe through the washing fluid. The path of the oil is indicated by arrows on Fig. 1, and is seen to be downward from the inlet pipe to the perforations in baffle 23, the oil flowing through the perforations, then over baffle 25, and downwardly again to the lower portion of baffle 24 where a part of the flow is through the perforations and a part is under the edge of the baffle. For a further description of this particular baffle construction, reference is made to my copending application Ser. No. 87,827 for a Method and apparatus for separating contaminated fluid mixtures.

The chamber A is designed to be filled with a washing fluid to any desirable height. To be effective the washing fluid level should be of sufficient height to cover the perforations of the baffles. For the purpose of indicating the height of the washing fluid a gauge glass 27 having the ordinary connections is provided outside of the shell 11. Communicating with the bottom of chamber A is a discharge pipe 28 by means of which accumulated mud, sand, and other solids may be removed.

Above chamber A is provided a wash chamber B in which the oil enters after leaving chamber A. To permit passage of the oil upward into chamber B the partition has an opening indicated at 14', over which is mounted a chimney 30. The chimney 30 is shown filled with wood wool 31, which is held in place by means of upper and lower screen members 32 and 33 respectively. In place of the wood wool some other filter material may be used or the chimney may be left open.

In the chamber B a system of baffles is provided to cause the oil to take a tortuous passage to the outlet and to cause it to pass through the wash fluid 34 which is preferably kept at a level just below the top of the chimney 30. A baffle 35 is mounted on partition member 15 and depends therefrom spaced a short distance from the chimney 30 and extending slightly below the top of the chimney. The baffle is apertured at 35' similar to baffles 23 and 24 and for the same reason. Also mounted across the chamber B is a baffle 36 which is spaced from partition members 14 and 15. This member is apertured at 36'. Extending slightly below the upper edge of baffle 36 and spaced therefrom is a baffle 37 mounted on the partition member 15.

Chamber B is provided with a manhole of any suitable construction as indicated diagrammatically at 38 in Fig. 3. For the purpose of determining the fluid level in the chamber, a gauge glass 27 is provided exteriorly of shell 11. A drain pipe 40 serves as means for regulating the level of fluid in the chamber. Fluid may be withdrawn by opening valve 41 in the pipe.

Above chamber B is a scrubbing chamber C over which is another scrubbing chamber D. A chimney 45 mounted over opening 15' in the partition 15 permits passage of oil from chamber B to chamber C, and is covered by a screen 46. Communicating with the chimney 45 is a pipe 47 having a valve 48 by means of which samples of the liquid being treated may be withdrawn. The pipe 47 leads downwardly to a funnel 49 adapted to catch the discharge from the pipe and other similar pipes subsequently to be described. The funnel is positioned at the inlet of a pipe 50 which may conduct the fluid discharged into the funnel to any desirable place. The pipe 47 may also be used as a means for injecting a treating reagent into the apparatus if desired.

Chambers C, D, E and F are each divided into four compartments as is diagrammatically shown in Figs. 4, 5, 6 and 7. These compartments are formed by the partition members 52, 53, 54 and 55 disposed at right angles to each other, however it is within the scope of the invention to use fewer partitions and have less compartments, as is subsequently described in connection with a modified form of the invention. Each compartment is accessible by means of a manhole 38. To permit passage of fluid from one compartment to the next, three of the partitions in each chamber are apertured as at 53', 54' and 55'. Communication between the chambers C, D, E and F is attained by chimneys 56 having screens 57 and 58 at their ends. These chimneys extend both above and below the partitions 16, 17 and 18 respectively, and are provided with testing pipes 47 having valves 48. The pipes discharge into funnel 49 similar to the sample or testing pipe 47.

Any number of the chambers C, D, E and F may be packed with filter material such as wood wool, but only chambers C and D are shown packed with wood wool, designated by reference numeral 60. These chambers containing wood wool or other scrubbing material are provided with false floors comprising screens 61. This construction provides sub-compartments 62 where the heavier fluids which are scrubbed from the oil as it passes through the filter material may accumulate. The sub-compartments are drained by pipes 63, each of the chambers C, D, E and F having four drain pipes as shown in Fig. 10. The pipes extend down to a trough or funnel (not shown) similar to funnel 49 and each is provided with a valved outlet similar to the valves 48 of pipes 47. The inlets of the drain pipes 63 are positioned in front of each of the partitions 52, 53, 54 and 55, that is, on the side of each partition toward which the oil flows.

The construction embodying the false floors, the sub-compartments and the means for withdrawing accumulated fluid from each sub-compartment is effective to prevent the scrubbing material from becoming logged with the heavier fluid (water) and thus facilitates the separation of the heavy fluid from the oil. With a drain pipe leading from each compartment it is possible to determine which compartments are functioning to separate the water from the oil and to what extent water is being removed in each compartment. The false bottom below the scrubbing material has been found in practice to facilitate the separation of the heavier liquids from the lighter liquids by permitting the heavier liquids to leave the porous material and to gather in the sub-compartments out of contact with the porous material.

In chambers C and D which are shown filled with wood wool 60, the communicating apertures 53', 54' and 55' are packed with wood wool forming what may be termed chokes 64. These chokes constitute a noteworthy feature of the invention and are instrumental in effecting the highly successful separation of the heavier and lighter liquids passing through the apparatus. The chokes are formed by packing the apertures with long fibered wood wool. By reason of the fact that the apertures are packed fairly tight, the chokes flare out on each side of the hole and are somewhat similar to a sheaf of wheat tied in the middle. In passing through these chokes the fluid is subjected to a very efficient scrubbing action by reason of the fact that the fluid must pass between the minute interstices between the tightly packed fiber components of the chokes. Channeling of the wood wool 60 is prevented by the construction embodying several compartments separated by partitions having the packed holes through which the fluid must pass. It is also prevented by the arrangement of the chimneys leading into and out of the scrubbing chambers whereby these chimneys extend a considerable distance into the wood wool beyond the partitions 15, 16 and 17.

Chambers E and F may be packed with wood wool if the particular fluid being treated requires additional scrubbing after passing through the chambers C and D, however this is seldom necessary and they have been shown without any filter material therein. These chambers serve to allow further separation of the heavier from the lighter fluids. Each of the chambers C, D, E, and F is provided with a gauge glass 27 for the purpose of determining the liquid level in the compartments.

Above chamber F is a chamber G and above this a chamber H for the further separation of any heavy liquids which may remain in the oil after it has passed through the lower chambers. The chamber G is similar to chamber B but turned 180 degrees thereto. A hole 21' in the partition 20 provides communication means with the chamber H. Fitted over the hole is a chimney 68 which extends up into the chamber H. Spaced from the chimney and extending below the top thereof is a baffle 69 perforated at 69' and serving to deflect and divide the liquid passing through the chamber. Another baffle is provided spaced a short distance from the outlet 72 and is indicated by reference numeral 70. It may be perforated at 70' if desired. The cover 13 forms the top of the chamber H and is provided with a gas outlet pipe generally indicated by numeral 73. A sample or test pipe 47' leads from this chamber to the funnel 49, being valved at 48', and is provided with an upturned intake 71.

In the operation of the device the contaminated oil to be treated enters the apparatus through pipe 22 and is discharged under pressure into the chamber A inside of the baffle ring 23. The entry of the oil forces the washing fluid or water 21 downwardly until the oil reaches the holes 23' and flows therethrough. The natural buoyancy of the oil causes it to rise over baffle 25 after which it is again forced down and through the holes 24' in baffle 24. The fluid then accumulates in the upper portion of the chamber A around baffle 24 and escapes into chamber B by passing through the chimney 30. In passing through chamber A most of the sand and heavier solids present in the oil separate and accumulate in the bottom of the chamber where they are subsequently withdrawn by means of pipe 28.

In passing through the chamber B the oil is forced to pass under or through perforations in the baffle 35, across the chamber, over or through perforations in the baffle 36, and finally under or through perforations in the baffle 37 before it can pass into chamber C by way of the chimney 45. In passing through this chamber the heavier liquid entrained in the oil is given opportunity to separate, particularly as it is caused to travel downwardly and laterally, and accumulate in the bottom of the chamber where it can be drawn off by means of the drain pipe 40.

Entering chamber C through the chimney 45 the oil is forced to pass counterclockwise around the chamber through the various compartments and in so doing is scrubbed by the wood wool. Further separation of the heavier components of the fluid is accomplished and the heavier fluid accumulates in the sub-compartments 62, each of which may be drained at will by its separate drain pipe 63. From chamber C the lighter fluid passes upward through a chimney 56 into the chamber D through which it passes traversing the wood wool in a clockwise direction. Further separation is accomplished as in the chamber below.

After leaving this chamber the oil passes upward into chamber E through a chimney 56. The oil passes through this chamber, further separation being accomplished and then the lighter liquid passes successively through the remaining chambers F, G, and H, as indicated by the arrows on the drawings.

In connection with the chimneys 45, and 56 and the upper chamber G, the sample or test pipes 47 and 47' were described as being provided. These pipes permit sampling of the fluid at various stages in its passage through the apparatus and thus provide means for determining the efficiency of the various chambers in separating the mud and bottom settlings from the oil. In the event it is desirable to inject a chemical treating reagent into the fluid at any stage of its passage through the device, these pipes 47 and 47' provide means for doing this.

By reason of the fact that separate drain pipes are provided for each of the compartments of the chambers C, D, E and F an accurate means is provided for determining which compartments are accomplishing the greatest separation of the heavier liquids from the lighter liquids as the fluid passes through the apparatus.

With apparatus constructed as shown and described, the contaminated fluid passing through the device must take a long tortuous passage before it can escape through the outlet. Moreover the greatest proportion of the flow through the apparatus is horizontal, thus providing ample opportunity for the separation of the heavier liquids from the lighter ones. In this connection, while the heavy liquids including the wash fluid are shown in the conventional manner, the oil is not so shown and merely its direction of flow is indicated by arrows.

In Figs. 11, 12 and 13 a modified construction is shown which embodies the same general principle of providing a plurality of horizontal chambers placed one above the other, each chamber being divided into compartments adapted to be filled with wood wool or left open as desired. In this form of the invention each chamber is divided into 3 compartments instead of 4, the compartments surrounding a central inlet pipe which extends through the middle of the shell.

Referring to Fig. 11 which is an elevation broken away at the top to show the upper portion of the device in true section and broken away at the bottom to show the lower portion of the device in section as it appears on line 11—11 of Fig. 12, reference numeral 78 generally indicates a shell or tank above which is mounted a gas trap generally indicated by 79. The contaminated oil is fed into the trap by means of pipe 80 through which it is either pumped or allowed to flow by gravity. The trap 79 has a baffle 82 against which the incoming fluid impinges and is provided with a gas outlet 83 which may be provided with suitable valves and be controlled at a desired point. The contaminated fluid in the gas trap discharges into the top of a stand pipe 84 which is positioned centrally of the shell and has its outlet at point 85 in the space between the inner ring of the baffle rings generally indicated by reference numeral 86, which are identical with the baffle rings described in connection with the preferred form of the invention.

The shell 78 is divided into a plurality of horizontal chambers by the annular horizontal partitions, two of which are shown at 87 and 88. The shell 78 has a conically formed bottom 90. The chamber A' formed by the partition 87 and the bottom of the shell is in all respects similar to the chamber A of Fig. 1. Above this chamber A' is a chamber J which is divided into three compartments by the partition walls 91, 92 and 93. A chimney 94 mounted over an opening 87' in the partition 87 establishes communication between chambers A' and J. The chimney 94 is covered with screen 95. A pipe 96 leads from the chimney and is for the same purposes as the pipes 47 described in connection with Fig. 1.

Referring to Fig. 12 it can be seen that two of the compartments are shown filled with wood wool 60 and that one compartment is left vacant. Although this particular arrangement has been shown, it is within the scope of this invention to fill either or all of the chambers with wood wool as desired. Two of the partition members, namely 92 and 93 in this particular case, are apertured at 92' and 93' to permit passage of fluid from one compartment to the next. These apertures are packed with long fibres of wood wool similar to the packing of the holes in the partitions as described in connection with Fig. 1. To prevent passage of any of the wood wool from the packed chambers to the vacant chamber, a screen 97 is provided over these apertures and enclosing the protruding fibres of the wood wool.

These compartments each have a false bottom provided by the screen members 98. This construction provides sub-compartments 99 between the screen members and the partition 87 in which the heavier fluid separated from the lighter fluids may accumulate. These sub-compartments are drained by means of individual drain pipes 100, the inlets of which are located respectively in front of each of the partitions 91, 92 and 93, that is, they are positioned on the side of the partition toward which the fluid flows. These pipes extend out beyond the shell 78 and may be brought down the side of the shell in a manner described in connection with the pipes 63 in Fig. 1. Each of the compartments is accessible by means of a manhole 101. A gauge glass 102 is provided for ascertaining the liquid level in the chamber.

Above the chamber J is located a chamber K constructed in a manner similar to chamber J except for the fact that the inlet chimney 103 which provides communication between the two chambers is on the opposite side of the partition which corresponds to partition 91 of chamber J. Thus the contaminated fluid passes through chamber K in a clockwise direction, that is, in a direction opposite to that which it takes in chamber J. This has been brought out in connection with the preferred form of the invention, the only difference being that in this modified form of the invention the fluid travels through only three compartments as compared to four in the preferred form.

Above chamber K is located a chamber similar to chamber J and above this is located a chamber similar to chamber K. Depending on the type of oil treated, the number of chambers with which the shell is provided is optional, and of these only a number sufficient to obtain desired results need be packed. Above the scrubbing chambers may be located one or more washing chambers. These chambers may be provided with suitable baffles to cause the oil to pass through the wash fluid before reaching outlet 105. A gas outlet 106 is provided in the top of the shell and may be controlled by a suitable valve.

With this construction a simpler and less expensive apparatus than the preferred form of the invention is provided. It is also true that this construction embodying the three compartments and the centrally located inlet pipe extending through the middle of the shell provides a particularly strong construction and guards against distortion of the partition walls, should the device become clogged at any time in the operation of it.

By the term "chimney" as used herein is meant a conduit providing communication between adjacent chambers and extending into one or both of the chambers.

I claim as my invention:

1. In a device for cleaning and separating a contaminated petroleum emulsion, the combination of a shell having inlet and outlet openings at opposite ends, horizontal partition members in said shell dividing it into a plurality of horizontally disposed chambers, filter material in said chambers, means providing communication between said chambers, partition walls in certain of said chambers forming compartments, certain of said partition walls having apertures therein and means for individually draining liquid from said chambers.

2. In a device for cleaning and separating a contaminated petroleum emulsion, the combination of a shell having inlet and outlet openings at opposite ends, horizontal partition members in said shell dividing it into a plurality of horizontally disposed chambers, filter material in said chambers, means providing communication between said chambers, partition walls in certain of said chambers forming compartments, certain of said partition walls being apertured, means for draining liquid from each of said chambers, and means for draining liquid from each of said compartments.

3. In a device for cleaning and separating a contaminated petroleum emulsion, the combination of a shell having inlet and outlet openings at opposite ends, horizontal partition members in said shell dividing it into a plurality of horizontally disposed chambers, chimneys providing communication between said chambers, partition walls in certain of said chambers forming compartments, certain of said partition walls being apertured, perforated false floors in said compartments forming sub-compartments, a scrubbing material packed in said compartments above said false floors, and means for draining liquid from each of said sub-compartments.

4. In a device for cleaning and separating a contaminated petroleum emulsion, the combination of a shell having inlet and outlet openings at opposite ends, horizontal partition members in said shell dividing it into a plurality of horizontally disposed chambers, chimneys providing communication between said chambers, partition walls in certain of said chambers forming compartments, certain of said partition walls being apertured, perforated false floors in said compartments comprising screen members and forming sub-compartments, a scrubbing material packed in said compartments above said floors, means for individually draining liquid from each of said sub-compartments, and means for draining liquid from each of the chambers not divided into compartments.

5. In a device for cleaning and separating a contaminated petroleum emulsion, the combination of a shell having inlet and outlet openings at opposite ends, horizontal partitions dividing said shell into a plurality of horizontal chambers, said partitions having a hole therein, chimneys mounted over the holes in said partitions for providing communication between said chambers, and means for withdrawing liquid from each of said chimneys and for injecting liquid into each of said chimneys.

6. For use in a device for cleaning and separating a contaminated petroleum emulsion, a scrubbing element comprising an enclosed chamber, partitions dividing said chamber into compartments, all but one of said partitions being apertured to permit passage of a fluid therethrough, said chamber being provided with an inlet and an outlet on opposite sides of the non-apertured partition, perforated false floors mounted in said compartments in spaced relation with the bottom of said chamber, and a scrubbing material packed into said compartments above said false floors.

7. For use in a device for cleaning and separating a contaminated petroleum emulsion, a scrubbing element comprising an enclosed chamber, partitions dividing said chamber into compartments, all but one of said partitions being apertured to permit passage of a fluid therethrough, said chamber being provided with an inlet and an outlet on opposite sides of the non-apertured partition, perforated false floors mounted in said compartments in spaced relation with the bottom of said chamber forming sub-compartments, a scrubbing material packed into said compartments above said false floors, and means for individually draining said sub-compartments.

8. For use in a device for cleaning and separating a contaminated petroleum emulsion, a scrubbing element comprising an enclosed chamber, partitions dividing said chamber into compartments, all but one of said partitions being apertured to permit passage of a fluid therethrough, said chamber being provided with an inlet and an outlet on opposite sides of the non-apertured partition, perforated false floors mounted in said compartments in spaced relation with the bottom of said chamber, a scrubbing material packed into said compartments above said false floors, chokes in the perforations of said partitions, said chokes comprising long fibered scrubbing material packed into said perforations, and means for draining liquid from each of said sub-compartments.

9. In a device for cleaning and separating a contaminated petroleum emulsion, the combination of a cylindrical vertical shell having an inlet and an outlet opening, horizontal partition members dividing said shell into a plurality of chambers, said partition members having a hole therein, filter material in said chamber, communicating means between said chambers comprising chimneys mounted over the holes in said partition members and extending into said chambers, and means in certain of said chambers for causing a fluid passing therethrough to flow through said chambers in a substantially circular horizontal path.

10. In a device for cleaning and separating a contaminated petroleum emulsion, the combination of a cylindrical vertical shell having an inlet and an outlet opening, horizontal partition members dividing said shell into a plurality of chambers, said partition members having a hole therein, communicating means between said chambers comprising chimneys mounted over the holes in said partition members and extending into said chambers, a scrubbing material packed tightly into certain of said chambers, means for withdrawing fluid from the bottom of said chambers, and means in certain of said chambers for causing a fluid passing therethrough to flow through said chambers in a circular horizontal path.

11. In a device for cleaning and separating a contaminated petroleum emulsion, the combination of a cylindrical vertical shell having an inlet and an outlet opening, horizontal partition members dividing said shell into a plurality of chambers, said partition members having a hole therein, communicating means between said chambers comprising chimneys mounted over the holes in said partition members and extending into said chambers, false perforated floors in certain of said chambers, a scrubbing material packed tightly into the chambers above said false floors, means for withdrawing liquid from said chambers, and means in certain of said chambers for causing a fluid passing therethrough to flow through said chambers in a circular horizontal path.

12. In a device for cleaning and separating a contaminated petroleum emulsion, the combination of housing means forming an enclosed lower chamber, said lower chamber having an inner and an outer circular baffle plate depending from the top of the chamber and having an intermediate circular baffle between said inner and outer baffles and having its upper edge spaced below the top of said chamber, conduit means for introducing a contaminated fluid into said chamber inside of said inner baffle, housing means forming an enclosed wash chamber above said lower chamber, said wash chamber having a chimney extending a substantial distance thereinto and communicating with said lower chamber, said wash chamber having baffles therein, and housing means forming an enclosed scrubbing chamber above said wash chamber, said scrubbing chamber having a chimney extending a substantial distance thereinto and communicating with said wash chamber and having an outlet, said scrubbing chamber having walls and thus being divided into compartments and having a false perforated floor in each of said compartments, scrubbing material packed into said compartments, and means for withdrawing liquid from each of said chambers.

13. In a device for cleaning and separating a contaminated petroleum emulsion, the combination of a cylindrical vertical shell, an inlet pipe mounted in said shell and extending centrally thereof, annular horizontally disposed partitions dividing said shell into a plurality of annular chambers, means providing communication between said chambers, partition falls in said chambers forming compartments, certain of said partition walls being apertured, thus permitting passage of fluid therethrough, and a scrubbing material in certain of said compartments.

14. In a device for cleaning and separating contaminated petroleum emulsion, the combination of a cylindrical vertical shell, an inlet pipe mounted in said shell extending centrally thereof, annular horizontally disposed partition members dividing said shell into a plurality of annular chambers, means providing communication between said chambers, partition walls in said chambers forming compartments, certain of said partition walls being apertured to permit passage of fluid therethrough, perforated false floors in said compartments forming subcompartments and a scrubbing material packed in said compartments above said false floors.

15. In an oil and water separator, the combination of a casing having a plurality of baffles arranged horizontally therein, said baffles being spaced apart vertically and each having perforated and imperforate portions arranged alternately with the perforated portion of one baffle adjacent the imperforate portion of the next adjacent baffle, said baffles having the entire peripheries thereof secured to the casing in such manner as to prevent flow around the baffles between the same and the casing and to cause flow through the perforated portions, a pervious contact material substantially filling the upper portion of the space between separated baffles, means for introducing oil emulsion into the lower portion of the casing for upflow through the baffles permitting settling out of the water from the oil emulsion over each baffle, a discharge conduit for the separated water leading from a portion of each baffle spaced inwardly from the casing directly laterally to a point externally of the casing, and means for draining off the separated oil from the upper portion of the casing above the baffles.

LAWRENCE A. HOLMES.